US009297917B2

(12) United States Patent
Mah et al.

(10) Patent No.: US 9,297,917 B2
(45) Date of Patent: Mar. 29, 2016

(54) HIGH-PRECISION TIME SYNCHRONIZATION FOR A CABLED NETWORK IN LINEAR TOPOLOGY

(71) Applicant: INOVA, LTD., Grand Cayman (KY)

(72) Inventors: Wah Hong Mah, Calgary (CA); Hua Ai, Calgary (CA); Lin Zhu, Calgary (CA); Timothy D. Hladik, Calgary (CA)

(73) Assignee: INOVA Ltd., Houston, TX (US)

( * ) Notice: Subject to any disclaimer, the term of this patent is extended or adjusted under 35 U.S.C. 154(b) by 543 days.

(21) Appl. No.: 13/750,264

(22) Filed: Jan. 25, 2013

(65) Prior Publication Data

US 2013/0191031 A1 Jul. 25, 2013

Related U.S. Application Data

(60) Provisional application No. 61/590,712, filed on Jan. 25, 2012.

(51) Int. Cl.
*G01V 1/22* (2006.01)
*G01V 1/28* (2006.01)
*G01V 1/26* (2006.01)

(52) U.S. Cl.
CPC .. *G01V 1/28* (2013.01); *G01V 1/22* (2013.01); *G01V 1/26* (2013.01); *G01V 2210/12* (2013.01)

(58) Field of Classification Search
CPC .................................. G01V 1/28; G01V 1/22
See application file for complete search history.

(56) References Cited

U.S. PATENT DOCUMENTS

| 6,253,156 | B1 | 6/2001 | Bui-Tran et al. |
| 7,660,201 | B2 | 2/2010 | Fleure et al. |
| 8,228,757 | B2 | 7/2012 | Beffa et al. |
| 2005/0001742 | A1* | 1/2005 | Small ...................... G01S 1/24 340/988 |
| 2005/0035875 | A1 | 2/2005 | Hall et al. |
| 2005/0047275 | A1 | 3/2005 | Chamberlain et al. |
| 2008/0049554 | A1 | 2/2008 | Crice et al. |
| 2008/0170469 | A1 | 7/2008 | Phillips et al. |
| 2008/0189044 | A1* | 8/2008 | Chamberlain ........... G01V 1/26 702/14 |
| 2010/0318299 | A1* | 12/2010 | Golparian ................ G01V 1/22 702/14 |
| 2011/0032798 | A1 | 2/2011 | Ray et al. |

* cited by examiner

*Primary Examiner* — Regis Betsch

(74) *Attorney, Agent, or Firm* — Mossman, Kumar & Tyler PC

(57) ABSTRACT

The present disclosure relates to methods and apparatuses for reducing propagation delay uncertainty while conducting a survey. The apparatus includes a plurality of nodes along a communication path configured to allow communication between nodes with only one clock domain boundary crossing. Each node may include a clock, a memory, and a processor. The plurality of nodes is arranged in a linear topology. The linear topology may have first and second nodes on the ends of the line. The method may include reducing propagation delay uncertainty using at least one time marker transmitted to each of the plurality of nodes without crossing a clock domain boundary of any other node.

15 Claims, 6 Drawing Sheets

HIGH-PRECISION TIME SYNCHRONIZATION FOR A CABLED NETWORK IN LINEAR TOPOLOGY

CROSS REFERENCE TO RELATED APPLICATIONS

This application claims priority from U.S. Provisional Application Ser. No. 61/590,712 filed Jan. 25, 2012, the disclosure of which is fully incorporated herein by reference in its entirety.

FIELD OF THE DISCLOSURE

This disclosure generally relates to reducing propagation delay uncertainty while conducting a survey.

BACKGROUND OF THE DISCLOSURE

Seismic surveys are conducted to map subsurface structures to identify and develop oil and gas reservoirs. Seismic surveys are typically performed to estimate the location and quantities of oil and gas fields prior to developing (drilling wells) the fields and also to determine the changes in the reservoir over time subsequent to the drilling of wells. On land, seismic surveys are conducted by deploying an array of seismic sensors (also referred to as seismic receivers) over selected geographical regions. These arrays typically cover 75-125 square kilometers or more of a geographic area and include 2000 to 5000 seismic sensors. The seismic sensors (geophones or accelerometers) are placed are coupled to the ground in the form of a grid. An energy source, such as an explosive charge (buried dynamite for example) or a mobile vibratory source, is used at selected spaced apart locations in the geographical area to generate or induce acoustic waves or signals (also referred to as acoustic energy) into the subsurface. The acoustic waves generated into the subsurface reflect back to the surface from subsurface formation discontinuities, such as those formed by oil and gas reservoirs. The reflections are sensed or detected at the surface by the seismic sensors (hydrophones, geophones, etc.). Data acquisition units deployed in the field proximate the seismic sensors may be configured to receive signals from their associated seismic sensors, at least partially processes the received signals, and transmit the processed signals to a remote unit (typically a central control or computer unit placed on a mobile unit). The central unit typically controls at least some of the operations of the data acquisition units' and may process the seismic data received from all of the data acquisition units and/or record the processed data on data storage devices for further processing. The sensing, processing and recording of the seismic waves is referred to as seismic data acquisition.

The traditional sensor used for acquiring seismic data is a geophone. Multi-component (three-axis) accelerometers, however, are more commonly used for obtaining three-dimensional seismic maps compared to the single component sensors seismic surveying layouts using multi-component sensors require use of more complex data acquisition and recording equipment in the field and a substantially greater bandwidth for the transmission of data to a central location.

A common architecture of seismic data acquisition systems is a point-to-point cable connection of all of the seismic sensors. Typically, output signals from the sensors in the array are collected by data acquisition units attached to one or more sensors, digitized and relayed down the cable lines to a high-speed backbone field processing device or field box. The high-speed backbone is typically connected via a point-to-point relay fashion with other field boxes to a central recording system, where all of the data are recorded onto a storage medium, such as a magnetic tape.

Seismic data may be recorded at the field boxes for later retrieval, and in some cases a leading field box is used to communicate command and control information with the central recording system over a radio link (radio frequency link or an "RF" link). Even with the use of such an RF link, kilometers of cabling among the sensors and the various field boxes may be required. Such a cable-system architecture can result in more than 150 kilometers of cable deployed over the survey area. The deployment of several kilometers of cable over varying terrain requires significant equipment and labor, often in environmentally sensitive areas.

Traditionally, seismic sensors generate analog signals that are converted into digital signals and recorded by a recording device. The seismic sensor, analog-to-digital converter, and recording device all receive power from a power supply. The analog-to-digital converter is usually located a distance away from the power supply (10 to 100 meters) to limit the effect of power supply noise on the analog-to-digital conversion. Supplying power to a converter over this distance often results in power transmission losses that reduces the available power from the power supply for operating other devices. This disclosure addresses the need for reduced power losses while maintaining a low noise environment for analog-to-digital signal conversion.

SUMMARY OF THE DISCLOSURE

In aspects, the present disclosure is related to methods and apparatuses for reducing propagation delay uncertainty while conducting a survey.

One embodiment according to the present disclosure includes a method for conducting a survey, comprising: reducing a propagation delay uncertainty in a plurality of nodes arranged in a linear topology using at least one time marker transmitted to each of the plurality of nodes on a path that only crosses one clocked domain boundary, wherein each of the plurality of nodes has a clocked domain boundary.

Another embodiment according to the present disclosure includes a system for conducting a survey, comprising: a communication path; and a plurality of nodes arranged in a linear topology along the communication path, wherein each node has a clock domain and the communication path is configured to have only one clock domain boundary between any two of the plurality of nodes.

Another embodiment according to the present disclosure includes non-transitory computer-readable medium product with instructions thereon that, when executed by at least one processor, causes the at least one processor to perform a method, the method comprising: reducing a propagation delay uncertainty in a plurality of nodes arranged in a linear topology using at least one time marker transmitted to each of the plurality of nodes on a path that only crosses one clocked domain boundary, wherein each of the plurality of nodes has a clocked domain boundary.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The present disclosure relates to devices and methods for conducting survey activities relating to data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein. A description for some embodiments for conducting a survey follows below.

Figure 1:
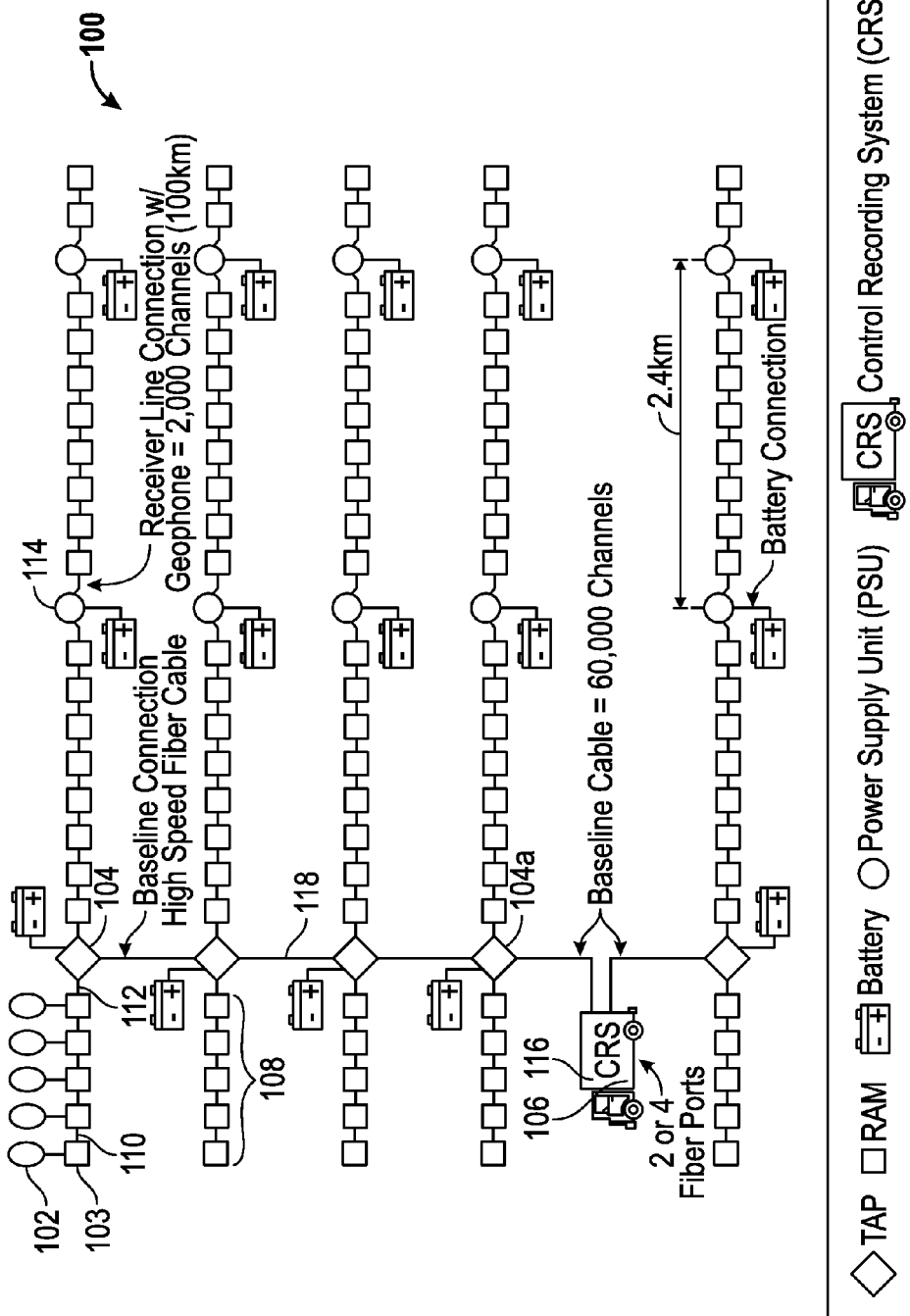
FIG. 1 shows a schematic of a seismic survey system according to one embodiment of the present disclosure.

FIG. 1 depicts an embodiment of a cable seismic data acquisition system 100. Such a system includes an array (string) of spaced-apart seismic sensor units 102. Seismic sensors units 102 may include, but are not limited to, one more of: geophones and hydrophones. Each sensor 102 is typically coupled via cabling to a data acquisition device (such as remote acquisition module (RAM) 103), and several of the data acquisition devices and associated sensors are coupled via cabling 110 to form a line or group 108. The group 108 is then coupled via cabling 112 to a line tap (such as fiber TAP unit (FTU) 104). Several FTUs 104 and associated lines 112 are usually coupled together by cabling, such as shown by the baseline cable 118.

A RAM 103 may be configured to record analog seismic signals that are generated by seismic sensors 102, including, but not limited to, geophones and hydrophones. The RAM 103 may be configured to convert analog signals from the seismic sensors 102 into digital signals. The digitized information may then be transmitted to an FTU 104. Some RAMs 103 are configured to relay signals from other RAMs 103 in group 108, in addition to receiving signal from one or more seismic sensors 102. The digitized information transmitted by the RAM 103 may be augmented with status information. The FTU 104 may be configured to transmit the digitized information to a central recording system (CRS) 106. In some embodiments, the RAM 103 may be configured to receive programming and/or parameter information downloads from the CRS 106. RAMs 103 generally receive power from another device, such as a power supply unit (PSU) 114 or FTU 104, however, RAMs 103 may be configured to include a battery.

The FTU 104 may be configured to receive digital information from one or more RAMs 103 and retransmit that information to the CRS 106. In some embodiments, retransmitted digital information may be augmented with status information for the FTU 104. The FTU 104 may also be configured to supply power to one or more RAMs 103. FTU 104 may itself receive power from a battery 126 or PSU 114. The FTU 104 may include multiple battery ports so that power may remain uninterrupted to the FTU 104 and any connected RAMs 103 when battery 126 is undergoing replacement.

The PSU 114 includes a power supply and may be configured to transmit power to the RAMs 103. In some configurations, the power from the PSU 114 may be transmitted to the RAMs 103 through the FTU 104. PSU 114 may receive power from a battery 130. The devices involved in seismic data acquisition may be collectively referred to as "seismic devices," which may include, but is not limited to: seismic sensors 102, RAMs 103, and FTUs 104, CRS 106, and auxiliary device 116.

In some embodiments, the RAM 103 and/or the FTU 104 may be used as an auxiliary device 116. An auxiliary device 116 may be configured to operate as a timing device. The auxiliary device 116 may be positioned in a recording truck or other comparable location. In some embodiments, the auxiliary device 116 may be dedicated as a timing device. The auxiliary device 116 may be in communication with baseline cables 118 and configured to the exact timing of the seismic shooting system to ensure that the T-zero is consistent. In some embodiments, the CRS 106 may provide the timing signal. The CRS 106 may be positioned in a recording truck or other comparable location.

In the field, the sensors 102 are usually spaced between 10-50 meters. Each of the FTUs 104 typically performs some signal processing and then stores the processed signals as seismic information. The FTUs 104 may be coupled, either in parallel or in series, with one of the units 104a serving as an interface between the CRS 106 and one or more FTUs 104. In the cable system of FIG. 1, data are usually relayed from RAM 103 to the next RAM 103 and through several FTUs 104 before such data reaches the CRS 106.

In a typical configuration, a plurality of RAMs 103 may be laid out in intervals (such as 12@55 meters) and connected to receiver cable lines. The receiver cable lines may also be connected to FTUs 104 and PSUs 114. The PSUs 114 may be laid out in intervals as well. The PSUs 114 may be connected to RAMs 103 in a one-to-one or a one-to-many relationship. The FTUs 104 may be laid out at intersecting points of the receiver line cables 112 and baseline fiber optic cables 118. The FTUs 104 may be connected to other FTUs 104 and/or the CRS 106 via fiber baseline cables 118.

In wireless embodiments, the FTUs 104 may communicate with the CRS 106 using radio frequency transmissions and are typically bandwidth limited. In traditional wireless seismic data acquisition systems, an attribute (physical or seismic) degradation affecting the data quality is typically detected by monitoring (printing and viewing) shot (source activation) records immediately after recording.

Figure 2A:
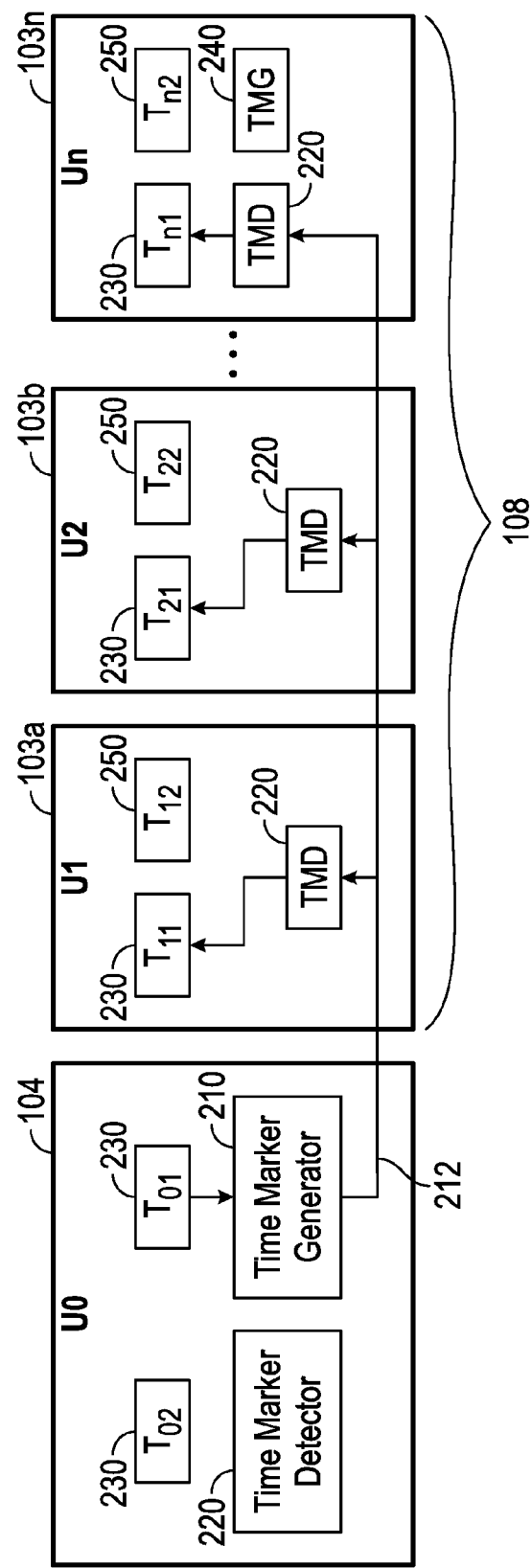
FIG. 2(a) shows a schematic of outbound time marker reception according to one embodiment of the present disclosure.
Figure 2B:
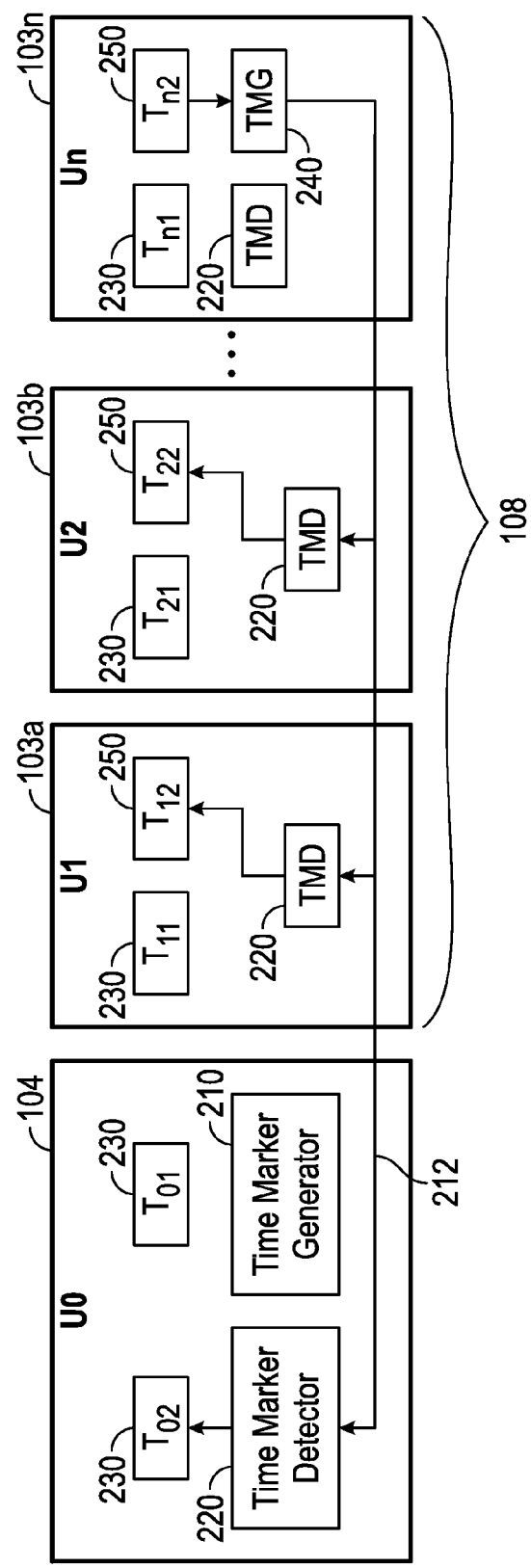
FIG. 2(b) shows a schematic of inbound time marker reception according to one embodiment of the present disclosure.
Figure 3:
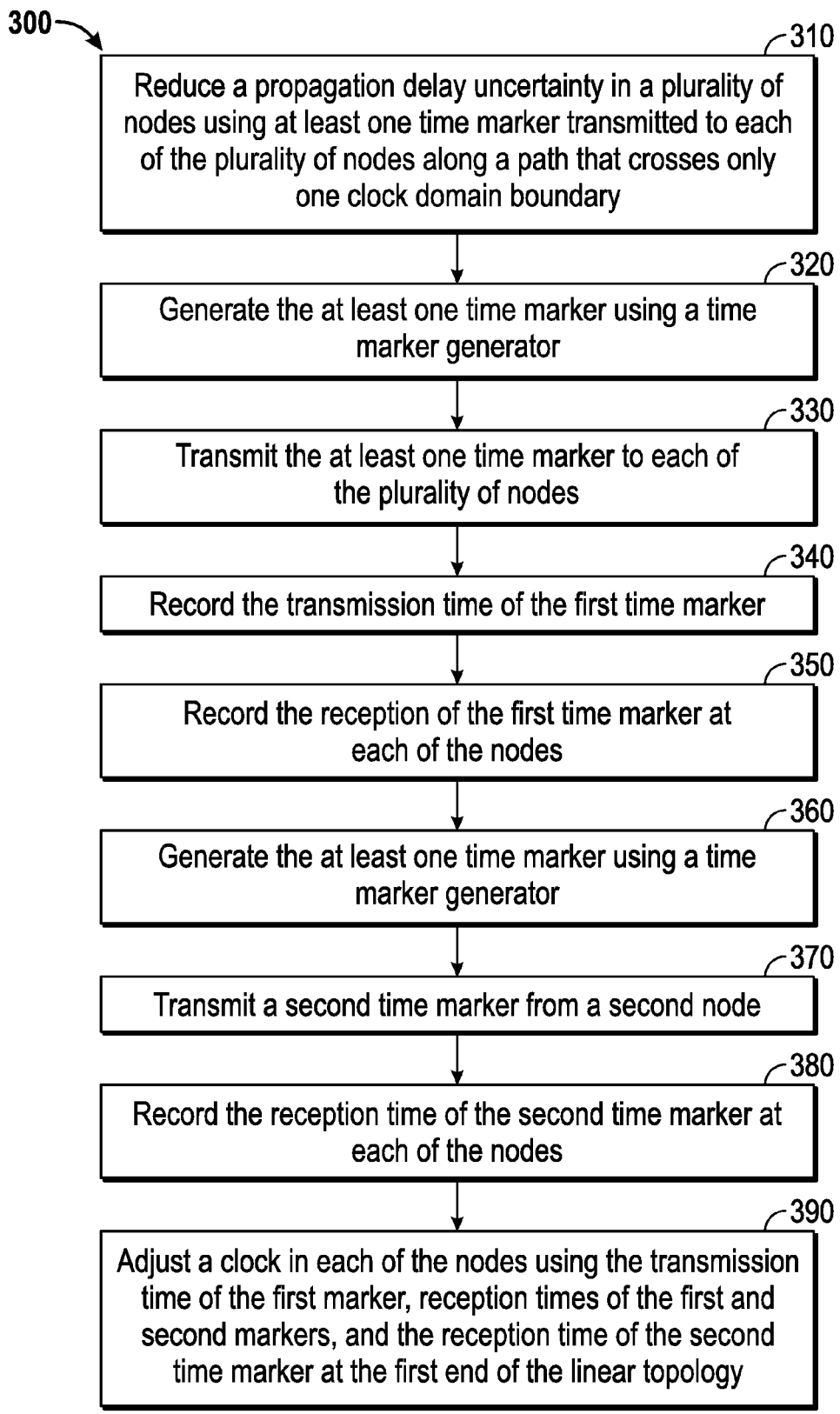
FIG. 3 shows a flow chart for a method for one embodiment according to the present disclosure.
Figure 4:
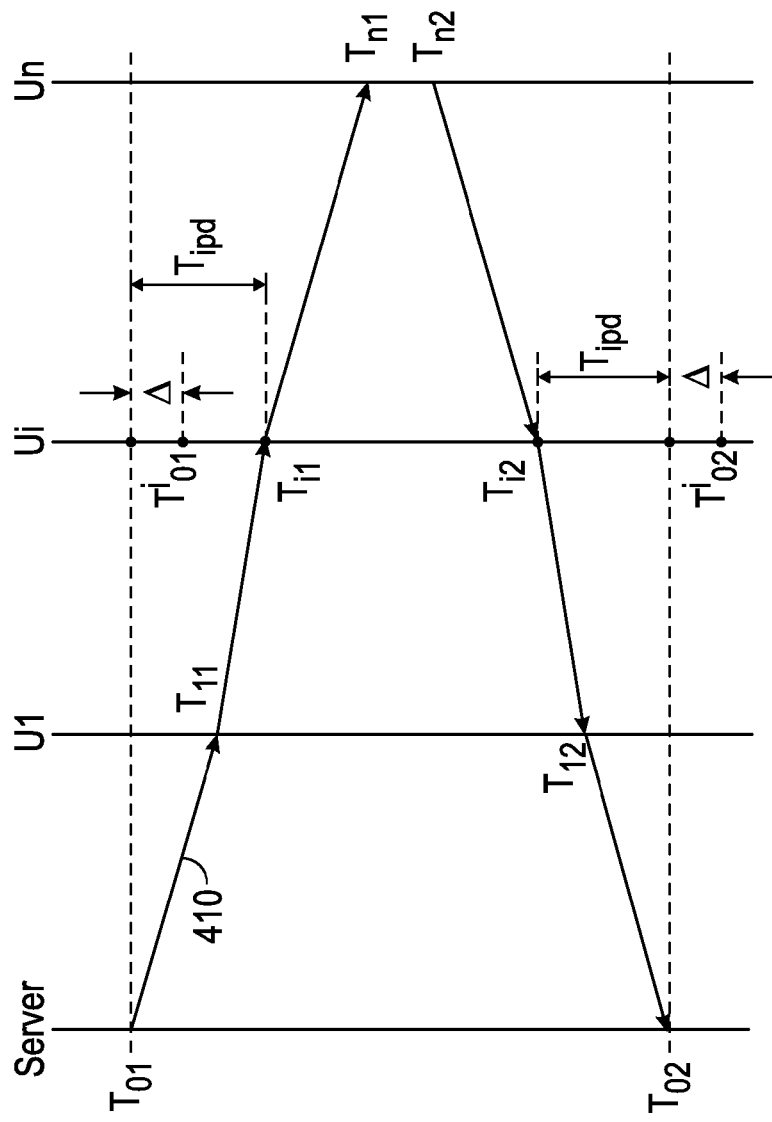
FIG. 4 shows a chart of reception times for one embodiment according to the present disclosure.

FIG. 2(a) shows an exemplary set of data acquisitions units (RAMs 103) in a group 108 arranged using a linear topology. The first node 104 at the first end of group 108 includes a time marker generator 210 configured to generate an outbound time marker that will be propagated to the RAMs 103. The first node may include at least one of: a RAM 103, an FTU 104, a CRS 106, an auxiliary device dedicated to timing 116, and any other device configured to generate an outbound time marker. The subsequent nodes (non-first nodes) $103a \ldots 103n$ may include their own clocks configured to generate clock cycles to regulate data flow. The end node (node on the second end of group 108) $103n$ may be configured to generate an inbound time marker that will be propagated to the non-second nodes 104, $103a \ldots 103n_{-1}$. Each of the nodes 104, $103a \ldots 103n$ has a clock (not shown) that controls timing within the clock domain of the node $104$, $103a \ldots 103n$. Each of the nodes $104$, $103a \ldots 103n$ is also in communication over a communication path $212$ and includes a time marker detector $220$ configured to detect and record the reception time of outbound time marker in a memory $230$.

Since each of the nodes $104$, $103a \ldots 103n$ has a clock domain, clock domain boundaries are formed at the interfaces between any two clock domains. Additionally, any non-node clocked device may have a clock domain. Thus, in order for a time marker to travel from one node to another node, at least one clock domain boundary must be crossed. The crossing of a clock domain may introduce a propagation delay uncertainty. In fact, the size of propagation delay uncertainty of a node may be correlated to the number of clock domain crossings that occur along the path of the time marker between two nodes. Thus, reducing propagation delay uncertainty may include reducing the number of clock domain crossings for a given path of a time marker.

Communication path $212$ may also include unclocked domain portions of one or more of the nodes $104$, $103a \ldots 103n$, as well as, substantially unclocked devices associated with receiver line cable $112$ (repeaters, FPGAs, etc.). Physically, communication path $212$ may include one or more sections of receiver line cable $112$. Communication path $212$ may be configured for bi-directional communication through the same line or through a pair of uni-directional lines operating in opposite directions. The transmission time of the outbound time marker is T=0 at the first node. Receiver line cable $112$ may include unclocked circuits along the propagation path from the first node $104$ to the second node $103n$, but not a clocked circuit that may introduce propagation delay uncertainty. Unclocked circuits may include, but are not limited to, cable connectors, PCB traces, transceivers, transformers, isolation devices, wire, unclocked logic devices, and unclocked portions of clocked devices (FPGAs, etc.)

FIG. $2(b)$ shows the exemplary set of nodes from FIG. $2(a)$ as of the arrival of the outbound time marker at the second node $103n$. In response to the reception of the outbound time marker, the second node $103n$ may be configured to use time marker generator $240$ to generate an inbound time marker. In some embodiments, the generation of an inbound time marker does not occur, such as when a system only requires a unidirectional path of travel for a signal (such as a time marker). The inbound time marker may be propagated to all of the non-second nodes $104$, $103a \ldots 103n_{-1}$. The time marker detectors $220$ are configured to detect the inbound time marker and store the reception time in a memory $250$. In some embodiments, memory $230$ and memory $250$ may be separate memory slots or locations of the same memory device. Memory $250$ of second node $103n$ is configured to store a time zero for the inbound time marker. The inbound time marker may be identical or different from the outbound time marker and will be configured to travel from the second node to the first node along the linear topology of nodes. The clocks in each of the nodes $104$, $103a \ldots 103n$ may be synchronized with each other FIG. $3$ shows a flow chart for a method $300$ according to one embodiment of the disclosure. In step $310$, a propagation delay uncertainty may be reduced by using a communication path $212$ for each of a plurality of nodes $104$, $103a \ldots 103n$ such that a time marker traveling along the communication path $212$ will only cross a single clock domain boundary when traveling from the node $104$ generating the time marker and the node $103a \ldots 103n$ receiving the time marker. In step $320$, the first node $104$ generates an outbound time marker using time marker generator $210$. In the step $330$, the outbound time marker is transmitted to the non-first nodes $103a \ldots 103n$ along communication path $212$. In step $340$, time zero is recorded in memory $230$ of first node $104$ as local time value $T_{01}$ when the outbound time marker is transmitted. In step $350$, the non-first nodes $103a \ldots 103n$ detect and record the reception of the outbound time marker at their local time $T_{i1}$ in memory $230$. The outbound time marker travels through the linear topology to each non-first node $103a \ldots 103n$ without crossing the clock domain boundaries of any other non-first node $103a \ldots 103n$. In step $360$, a second node $103n$ at the second end of the linear topology generates an inbound time marker in response to the detection of the outbound time marker. The second node $103n$ is configured to use time marker generator $240$ to generate the inbound time marker. The inbound time marker may be identical (except for travel direction) or different from the outbound time marker. In step $370$, the inbound time marker is transmitted to the non-second nodes $104$, $103a \ldots 103n_{-1}$ along communication path $212$. Time zero for inbound time marker is recorded in memory $250$ of the second node $103n$ at local time value $T_{n2}$ when the inbound time marker goes out. In step $380$, the non-second nodes $104$, $103a \ldots 103n_{-1}$ detect and record the reception of the inbound time marker at their local time $T_{i2}$ in memory $250$. The inbound time marker travels through the linear topology to each non-second node $104$, $103a \ldots 103n_{-1}$ without crossing the clock domain boundaries of any other non-second node $104$, $103a \ldots 103n_{-1}$. The travel path of the inbound time marker may or may not be identical to the reverse of the travel path of the outbound time marker. In step $390$, the clock in each node $103a \ldots 103n$ in group $108$ may be with the clock in node $104$ by adjusting its time counter value based on the following formula:

$$T_{ipd} = ((T_{i1} - T_{01}) - (T_{i2} - T_{02}))/2$$

$$\Delta = ((T_{01} + T_{02}) - (T_{i1} + T_{i2}))/2$$

The use of the apparatus and method for performing a seismic survey is illustrative and exemplary only. Embodiments of this disclosure may be implemented on any survey involving data acquisition using a linear topology, including tree topologies.

FIG. $4$ shows the theory behind the propagation delay estimation. Curve $410$ shows the local time line of events with intersections for the reception times at first node $104$ (Server), the first of the non-first nodes $103a$, and the second node $103n$ (Un). Line Ui could be any node between the node $103a$ and $103n$. Since the time is not synchronized, the device Ui's time counter may not reach time value $T_{01}$ until after a time difference of $\Delta$. The same applies to $T_{02}$.

At the first node $104$'s local $T_{01}$, the first node $104$ sends out the outbound time marker down the line, and the outbound time marker arrives at node $103i$ at its local time $T_{i1}$. When the second node $103n$ (Un) receives the outbound time marker at $T_{n1}$, second node $103n$ sends an inbound time marker back towards the first node $104$ at $T_{n2}$. This inbound time marker arrives at node $103i$ (Ui) at $T_{i2}$, and arrives at the first node $104$ at $T_{02}$.

The propagation delay between the first node $104$ and node $103i$ may be expressed as:

$$T_{ipd} = T_{i1} - T'_{01} + \Delta = T'_{02} - T_{i2} - \Delta$$

where $T_{ipd}$ is the propagation delay for node $103i$.

The time difference between the first node $104$ and node $103i$ would be $$T_{i1} - T'_{01} + \Delta = T'_{02} - T_{i2} - \Delta$$

$$2\Delta = T'_{02} - T_{i2} - T_{i1} + T'_{01}$$

$$\Delta = ((T^i{}_{01} + T^i{}_{02}) - (T_{i1} + T_{i2}))/2$$

Therefore, $$T_{ipd} = ((T^i{}_{02} - T^i{}_{01}) - (T_{i2} - T_{i1}))/2 \qquad 5$$

Since $T^i{}_{01}$, $T^i{}_{02}$ and $T_{01}$, $T_{02}$ have the same time value, the formulas can be shown as below:

$$\Delta = ((T_{01} + T_{02}) - (T_{i1} + T_{i2}))/2$$

$$T_{ipd} = ((T_{02} - T_{01}) - (T_{i2} - T_{i1}))/2$$

In some embodiments, use of this high precision time synchronization method may result in a maximum synchronization error of less than about 4 master clock cycles. In some embodiments, the maximum synchronization error may be reduced to less than about 2 times the master clock cycle. For example, if using a 32.768 MHz clock, less than ±30.52 ns error from the server can be achieved.

Figure 5:
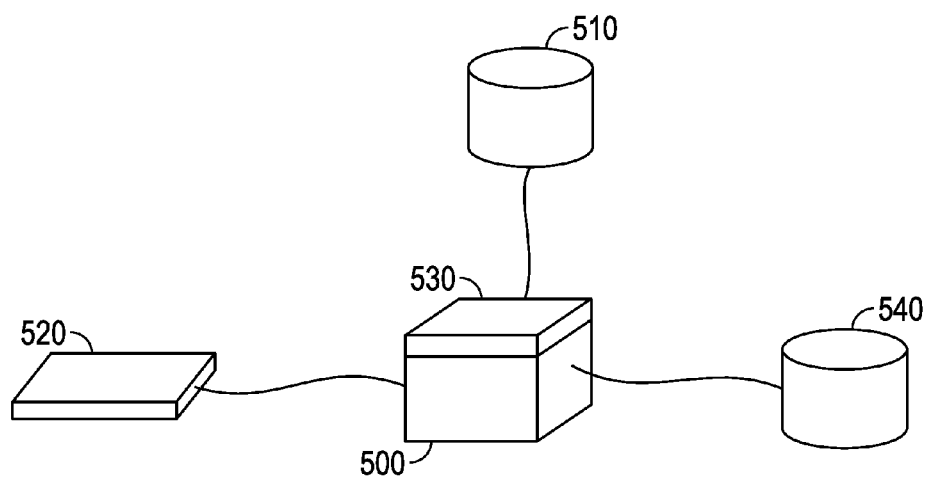
FIG. 5 shows a schematic of a computer system for performing one embodiment according to the present disclosure.

As shown in FIG. 5, certain embodiments of the present disclosure may be implemented with a hardware environment that includes an information processor 500, an information storage medium 510, an input device 520, processor memory 530, and may include peripheral information storage medium 540. The hardware environment may be in the well, at the rig, or at a remote location. Moreover, the several components of the hardware environment may be distributed among those locations. The input device 520 may be any information reader or user input device, such as data card reader, keyboard, USB port, etc. The information storage medium 510 stores information provided by the detectors. Information storage medium 510 may be any non-transitory computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 510 stores a program that when executed causes information processor 500 to execute the disclosed method. Information storage medium 510 may also store the formation information provided by the user, or the formation information may be stored in a peripheral information storage medium 540, which may be any standard computer information storage device, such as a USB drive, memory stick, hard disk, removable RAM, or other commonly used memory storage system known to one of ordinary skill in the art including Internet based storage. Information processor 500 may be any form of computer or mathematical processing hardware, including Internet based hardware. When the program is loaded from information storage medium 510 into processor memory 530 (e.g. computer RAM), the program, when executed, causes information processor 500 to retrieve detector information from either information storage medium 510 or peripheral information storage medium 540 and process the information to estimate a parameter of interest. Information processor 500 may be located on the surface or downhole.

While the foregoing disclosure is directed to the one mode embodiments of the disclosure, various modifications will be apparent to those skilled in the art. It is intended that all variations be embraced by the foregoing disclosure.

What is claimed is:

1. A system for performing a seismic survey of a formation, comprising:
at least one seismic sensor configured to supply an analog signal indicative of reflections of acoustic energy from an earth surface;
a seismic device comprising an analog-to-digital converter in electrical communication with the at least one seismic sensor, the seismic device configured to receive the analog signal and supply digital information representative of the analog signal;
a central recording system configured to receive the digital information from the seismic device;
a communication path between the seismic device and the central recording system; and
a plurality of nodes arranged in a linear topology along the communication path, wherein each node has a clock domain and the communication path is configured to have only one clock domain boundary between any two of the plurality of nodes;
wherein one of the plurality of nodes is a first node configured to transmit an outbound time marker to each of the other nodes of the plurality of nodes and another of the plurality of nodes is an end node configured to transmit an inbound time marker to each of the other nodes of the plurality of nodes, wherein the transmitted outbound time marker is transmitted in a direction relative to a position of the first node in the linear topology along the communication path, wherein the transmitted inbound time marker is transmitted to the first node and each node between the first node and the end node in the linear topology along the communication path; and
wherein each of the plurality of nodes between the first node and the end node comprises:
a memory;
a clock; and
a processor configured to:
receive and store a local reception time of the outbound time marker and a local reception time for the inbound time marker in the memory;
reduce a propagation delay uncertainty for communications from the first node to at least one other node of the plurality of nodes by calculating the propagation delay based on a transmission time of the outbound time marker from the first node representing a transmission time recorded by the first node, the local reception time of the outbound time marker, the local reception time of the inbound time marker, and a reception time of the inbound time marker at the first node representing a reception time recorded by the first node; and
adjust the clock to enable consistent T-zero for the system for seismic shooting using the estimated propagation delay from the first node.

2. The system of claim 1, wherein the communication path includes unclocked domain portions of one or more of the plurality of nodes.

3. The system of claim 1, wherein the communication path is configured for bi-directional communication through a single cable line.

4. The system of claim 1, wherein the communication path includes a pair of uni-directional cable lines.

5. The system of claim 1, wherein each of the plurality of nodes has a clock cycle and the reduced propagation delay uncertainty is less than about 4 times the clock cycle.

6. A method of performing a seismic survey of a formation, comprising:
arranging a plurality of nodes in a linear topology, wherein the plurality of nodes comprises at least a first node and an end node;

transmitting an outbound time marker to each of the other nodes of the plurality of nodes using the first node on a communication path that only crosses one clock domain boundary;

transmitting an inbound time marker to each of the other nodes of the plurality of nodes using the end node on the communication path that only crosses one clock domain boundary;

recording a local reception time of the outbound time marker received by at least one node of the plurality of nodes;

recording a local reception time of the inbound time marker received by the at least one node of the plurality of nodes;

recording a reception time of the inbound time marker by the first node; and reducing a propagation delay uncertainty for communications from the first node to at least one other node of the plurality of nodes by calculating the propagation delay based on a transmission time of the outbound time marker from the first node representing a transmission time recorded by the first node, the local reception time of the outbound time marker, the local reception time of the inbound time marker, and the reception time of the inbound time marker at the first node representing a reception time recorded by the first node, wherein each of the plurality of nodes has a clock domain, the communication path is configured to have only one clock domain boundary between any two of the plurality of nodes, the transmitted outbound time marker is transmitted in a direction relative to a position of the first node in the linear topology along the communication path, and the transmitted inbound time marker is transmitted to the first node and each node between the first node and end node in the linear topology along the communication path.

7. The method of claim 6, further comprising:
generating the outbound time marker using a time marker generator on the first node.

8. The method of claim 6, wherein the first node is on a first end of the linear topology and the end node is on a second end of the linear topology.

9. The method of claim 8, further comprising:
adjusting a clock on each of the plurality of nodes using the estimated propagation delay from the first node.

10. The method of claim 9, wherein at least one node is a seismic device, the method further comprising:
receiving an analog signal at a seismic device that comprises a node, the signal indicative of reflections of acoustic energy from an earth surface;
converting the analog signal to digital information at the seismic device in dependence upon a clock signal from an adjusted clock on the node;
imaging an area below the earth surface in dependence upon the digital information from the seismic device.

11. The method of claim 6, further comprising:
recording a transmission time of the outbound time marker from the first node.

12. The method of claim 6, wherein the reduced propagation delay uncertainty is less than about 4 times the clock cycle.

13. The method of claim 6, wherein the survey includes a seismic survey.

14. A non-transitory computer-readable medium product with instructions thereon that, when executed by at least one processor, causes the at least one processor to perform a method of performing a seismic survey of a formation using a plurality of nodes arranged in a linear topology, wherein the plurality of nodes comprises at least a first node and an end node, the method comprising:
transmitting an outbound time marker to each of the other nodes of the plurality of nodes using the first node on a communication path that only crosses one clock domain boundary;

transmitting an inbound time marker to each of the other nodes of the plurality of nodes using the end node on the communication path that only crosses one clock domain boundary;

recording a local reception time of the outbound time marker received by at least one node of the plurality of nodes;

recording a local reception time of the inbound time marker received by the at least one node of the plurality of nodes;

recording a reception time of the inbound time marker by the first node; and reducing a propagation delay uncertainty for communications from the first node to at least one other node of the plurality of nodes by calculating the propagation delay based on a transmission time of the outbound time marker from the first node representing a transmission time recorded by the first node, the local reception time of the outbound time marker, the local reception time of the inbound time marker, and the reception time of the inbound time marker at the first node representing a reception time recorded by the first node, wherein each of the plurality of nodes has a clock domain, the communication path is configured to have only one clock domain boundary between any two of the plurality of nodes, the transmitted outbound time marker is transmitted in a direction relative to a position of the first node in the linear topology along the communication path, and the transmitted inbound time marker is transmitted to the first node and each node between the first node and end node in the linear topology along the communication path.

15. The non-transitory computer-readable medium product of claim 14, further comprising at least one of: (i) a ROM, (ii) an EPROM, (iii) an EEPROM, (iv) a flash memory, and (v) an optical disk.

* * * * *